March 29, 1966 K. JANKE 3,242,513

GROUND WORKING TOOL

Filed March 23, 1964

Karl Janke
INVENTOR.

BY *Clarence A. O'Brien*
*and Harvey B. Jackson*
Attorneys

United States Patent Office 3,242,513
Patented Mar. 29, 1966

3,242,513
GROUND WORKING TOOL
Karl Janke, Garden City, Kans.
Filed Mar. 23, 1964, Ser. No. 353,669
2 Claims. (Cl. 7—14.55)

This invention relates to a novel and useful ground-working tool and more specifically to a tool which may be utilized to dig hard ground having a large portion thereof formed of rock or other types of hard ground such as ground which has been frozen.

The ground-working tool of the instant invention includes a heavy elongated shank with a narrow curved spade-like blade on one end thereof and a pointed shank-type terminal end on the other end thereof. The opposite ends of the ground-working tool may be selectively used to advantage in digging hard ground and for other purposes such as may be desired.

The elongated shank of the instant invention is constructed whereby its overall length may be varied inasmuch as the shank is formed of two shank sections which are removably secured together. The end of the elongated shank to which the shank-type terminal end is secured is provided with a longitudinal threaded bore and the pointed shank-type end is removably and threadedly engaged in the threaded bore. The shank-type end comprises a double-ended elongated member and each end thereof may be telescopingly secured within the corresponding end of the shank of the ground-working tool. Therefore, the reversible shank-type end may have many uses and the opposite ends thereof may have configurations adapting the ground-working tool to dig various types of ground.

The main object of this invention is to provide a ground-working tool including means by which various types of hard ground may be readily dug thereby.

A further object of this invention is to provide a ground-working tool which may be utilized effectively in close quarters.

Still another object of this invention is to provide a tool that may be readily constructed in a manner so as to be readily adaptable for use in various environments.

A final object of this invention is to provide a ground-working tool in accordance with the preceding objects which will conform to conventional forms of manufacture, be of simple construction and easy to use so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
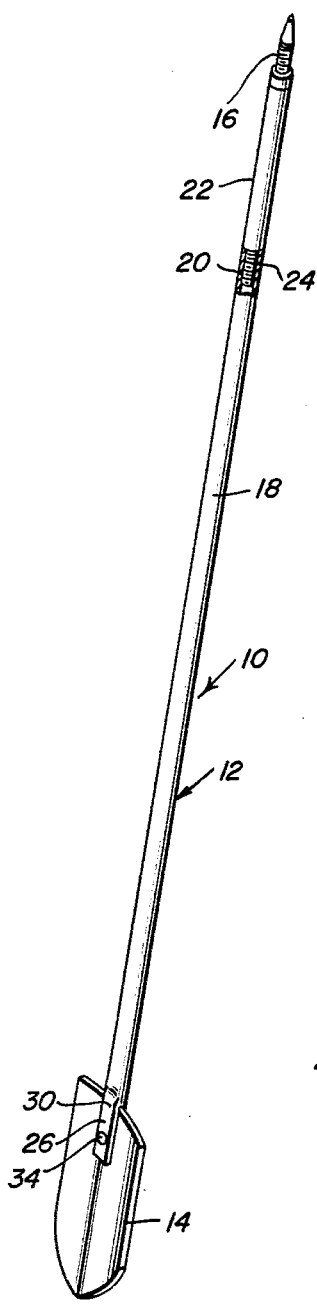
FIGURE 1 is a perspective view of the ground-working tool of the instant invention shown with portions thereof being broken away and shown in section.
Figure 3:
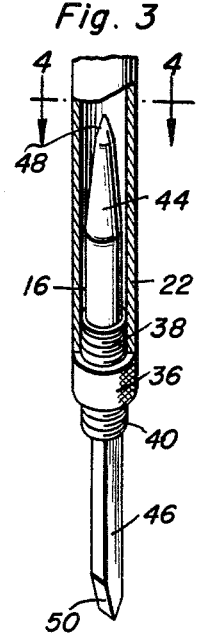
Figure 2:
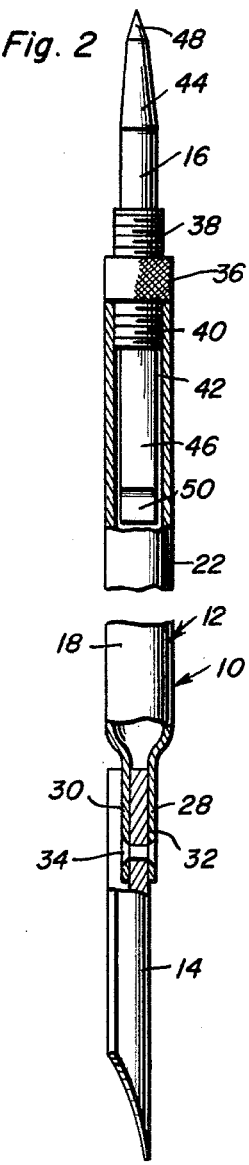
FIGURE 2 is a fragmentary enlarged elevational view of the ground-working tool with portions thereof disposed intermediate its opposite ends removed and portions of its opposite ends broken away and shown in section.
Figure 4:
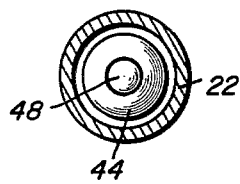

FIGURE 3 is a fragmentary enlarged elevational view of one end of the ground-working tool with portions thereof being broken away and shown in section to more clearly illustrate the manner in which the shank-type end portion carried thereby may be reversed in position; and FIGURE 4 is an enlarged horizontal sectional view taken substantially upon the plane indicated by the section line 4—4 of FIGURE 3.

Referring now more specifically to the drawings, the numeral 10 generally designates the ground-working tool of the instant invention which includes an elongated shank generally referred to by the reference numeral 12 having a thin spade-like digging element 14 on one end and a reversible shank-type digging element 16 on the other end.

The shank 12 includes a first section 18 having an internally threaded longitudinal bore 20 formed therein which opens outwardly of one end thereof. The shank 12 also includes a second section 22 including a diametrically reduced externally threaded shank portion 24 on one end threadedly engaged in the bore 20. The second section 22 comprises an extension for the shank 12 and may or may not be used as desired.

The end of the first section 18 remote from the bore 20 is flattened as at 26 and is bifurcated so as to include a pair of furcations 28 and 30 defining a slot 32 therebetween. The thin spade element or member 14 is seated in the slot 32 and is secured in the latter by means of a suitable fastener 34 secured through the furcations 28 and 30 and the portion of the spade element 14 disposed within the slot 32.

The reversible shank-type digging element 16 comprises an elongated rod-like member including a diametrically enlarged shoulder portion 36 intermediate its opposite ends. The opposite ends of the rod-like member 16 are externally threaded as at 38 and 40 and are each threadedly engageable in a threaded longitudinal bore formed in the end of the second section 22 remote from the diametrically reduced shank portion 24 thereof. In addition, it may be seen that the opposite ends of the rod-like member 16 terminate in diametrically reduced terminal end portions 44 and 46, the terminal end portion 44 defining a conical tip 48 while the terminal end portion 46 defines a chisel point 50.

Each of the terminal end portions 44 and 46 is loosely telescopically receivable in the bore 42 and it will therefore be noted that the digging element 16 is reversible. In addition, it will be noted that the bores 20 and 42 are of identical cross-sectional size and that they each are provided with the same number of threads per inch. In this manner, the digging elements may also be reversibly secured in the bore 20 when it is not desired to use the second section or extension 22.

It is believed that the use of the tool will be apparent from the foregoing and that the various earth-working ends thereof may be utilized to advantage in digging different types of hard ground. The shoulder 36 abuts against whatever section of the shank 12 in which the digging element 16 is secured. Further, the digging element 16 may be reversed end-to-end so as to provide a different digging point. The elongated shank 12 of the tool 10 enables the ground-working tool to be utilized in close quarters and it is to be understood that the shank 12 will have appreciable weight wherein its momentum during its rapid advancement toward hard ground will assist in forcing the lowermost end of the tool 10 into the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A ground-working tool comprising an elongated tubular shank, one end of said tubular shank being internally threaded, an elongated reversible shank-type digging element, said element including an elongated rod-like member including a center diametrically enlarged shoulder portion disposed between its opposite end portions, the opposite end portions of said rod-like member being externally threaded and selectively threadedly engageable in said bore, the remote terminal end portions of said opposite end portions being alternately fully telescopingly receivable in said one end of said shank, said terminal end portions each including a work-engaging terminal end, one end of said element being telescoped in said one end of said shank and threadedly engaged in said bore with the terminal end of said one end of said shank abutting said shoulder, the other end of said shank being partially flattened and bifurcated and said furcations being generally panel-like in shape, the medial planes of said furcations generally paralleling the medial plane of said flattened end portion, an earth working blade clampingly secured between the furcations of said bifurcated other end of said shank.

2. The combination of claim 1 wherein said shank comprises a first tubular section and a second tubular section including a diametrically reduced externally threaded end portion threadedly engaged in the adjacent end of said first section, said one end of said shank comprising the end of said second section remote from said first section.

References Cited by the Examiner
UNITED STATES PATENTS

| | | | |
|---|---|---|---|
| 1,464,353 | 8/1923 | Crinella | 294—51 |
| 3,023,015 | 2/1962 | Pankow | 145—50 X |

GERALD M. FORLENZA, *Primary Examiner.*

G. F. ABRAHAM, *Assistant Examiner.*